H. A. BARNES.
Car Coupling.
No. 25,938.  
Patented Nov. 1, 1859.
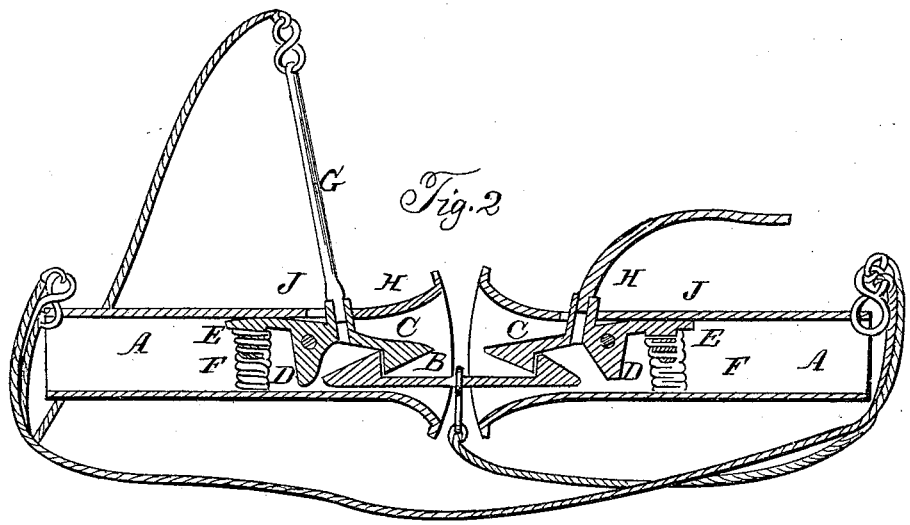
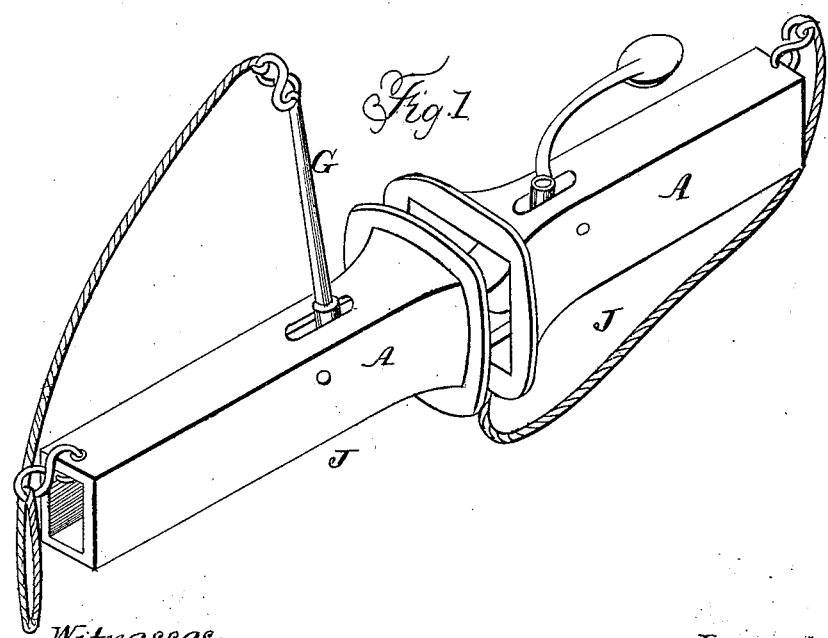
Witnesses:  
W. G. Whipple  
F. W. Pitkin
Inventor:  
Henry A Barnes

UNITED STATES PATENT OFFICE.

HENRY A. BARNES, OF MILWAUKEE, WISCONSIN.

RAILROAD-CAR COUPLING.

Specification of Letters Patent No. 25,938, dated November 1, 1859.

*To all whom it may concern:*

Be it known that I, HENRY A. BARNES, of Milwaukee, county of Milwaukee, and State of Wisconsin, have invented a new and useful Improvement in Car-Couplings; and I do hereby declare that the same is described and represented in the following specification and drawings, and to enable others skilled in the art to make and use the same I will proceed to describe its construction and operation, referring to the drawings, in which the same letters indicate like parts in each of the figures.

Figure 1, is an isometrical view of my improvement. Fig. 2, is a sectional view of the same.

A, shows the drawheads, which may be constructed, and secured, to the cars, much in the ordinary way, and in the upper side of which is made, or provided with apertures I, to allow, or admit of a free action, or movement of the socket projection of the latch, which receives the operating lever.

B, is a latch or hook coupling, which may be made in the hook and link form when desirable, so as to connect with cars as ordinarily constructed with the pin fastening.

C, is a latch secured in the draw head, by a pin, or bolt J. The form of its construction will be fully understood by the drawings.

H, is a socket projection formed on the upper side of the latch just forward of the pin or bolt J, the object of which is to receive the lever or treadle G, and by which the latch C, is operated either by hand or foot, when desirable.

D, is a cam formed on the under side of the latch and making part of the same. The office of said cam is to bear upon the end of the latch, or hook, link, coupling B, to prevent its rising with the latch, or hook C, and at the same time aids, or helps, with the action of the lever or treadle G, to disengage the connection formed by B, and C.

F, is a spiral spring, secured in place by a pin E, in the underside of the back portion of the latch just back of the pin or bolt J.

I am aware that other kinds of springs can be used and produce the same effect, or the outer end of the latch may be made weighty, thereby avoiding the necessity of springs, as the latch will keep its place by its own gravity.

Now it will be seen, that by a quick and simple act of the hand or foot, upon the lever or treadle G, in case of an emergency, the connection will be severed or disengaged by the joint action of the cam C and the lever or treadle G, and in very many instances, in all probability, would have proved the means of saving life and property.

I believe I have thus described the nature, construction, and advantage, to be derived from my improvement, so as to enable a person skilled in the manufacture to make and use the same.

I am aware that latch, or hook connections have been used before, such therefore separately considered I do not claim. But

What I claim and desire to secure by Letters Patent is—

The arrangement of the latch C, in the draw head A, in combination with the cam D, latch or hook connection B, lever or treadle G, substantially in the manner as and for the purpose described.

HENRY A. BARNES.

Witnesses:
W. G. WHIPPLE,
F. W. PITKIN.